United States Patent [19]
Hanson

[11] 3,934,465
[45] Jan. 27, 1976

[54] POST-TENSIONING LOAD CELL

[75] Inventor: John Arvid Hanson, Mt. Prospect, Ill.

[73] Assignee: United States Gypsum Company, Chicago, Ill.

[22] Filed: Feb. 8, 1973

[21] Appl. No.: 330,655

[52] U.S. Cl............................ 73/143; 73/141 A
[51] Int. Cl............................................ G01l 5/10
[58] Field of Search........... 73/88 E, 88.5 R, 141 A, 73/143

[56] References Cited
UNITED STATES PATENTS

| | | | |
|---|---|---|---|
| 2,036,458 | 4/1936 | Carlson | 73/88 E UX |
| 2,591,255 | 4/1952 | Segerstad et al. | 73/141 A |
| 2,656,717 | 10/1953 | Fourmanoit | 73/141 A X |
| 2,754,107 | 7/1956 | Ernst et al. | 73/141 A UX |
| 3,084,542 | 4/1963 | Statham | 73/141 A |

FOREIGN PATENTS OR APPLICATIONS

| | | | |
|---|---|---|---|
| 1,484,533 | 5/1969 | Germany | 73/88 E |
| 724,757 | 2/1955 | United Kingdom | 73/143 |

Primary Examiner—Charles A. Ruehl
Attorney, Agent, or Firm—Samuel Kurlandsky, Esq.; Stanton T. Hadley, Esq.; Kenneth E. Roberts, Esq.

[57] ABSTRACT

The load cell disclosed is for detecting changes in tensile loading of a multiwire structural post-tensioning tendon for a concrete structure. The load cell has a pair of spaced end plates, an elastically deformable cylindrical steel member which extends between and is connected to the peripheral portions of the end plates, and a telemetric strain sensing device mounted between the end plates centrally within the cylinder. The cylindrical steel member carries the full load of the post-tensioning tendon, and because of the central location of the strain sensing device within the cylinder member, measurements will not be affected by eccentricity.

12 Claims, 4 Drawing Figures

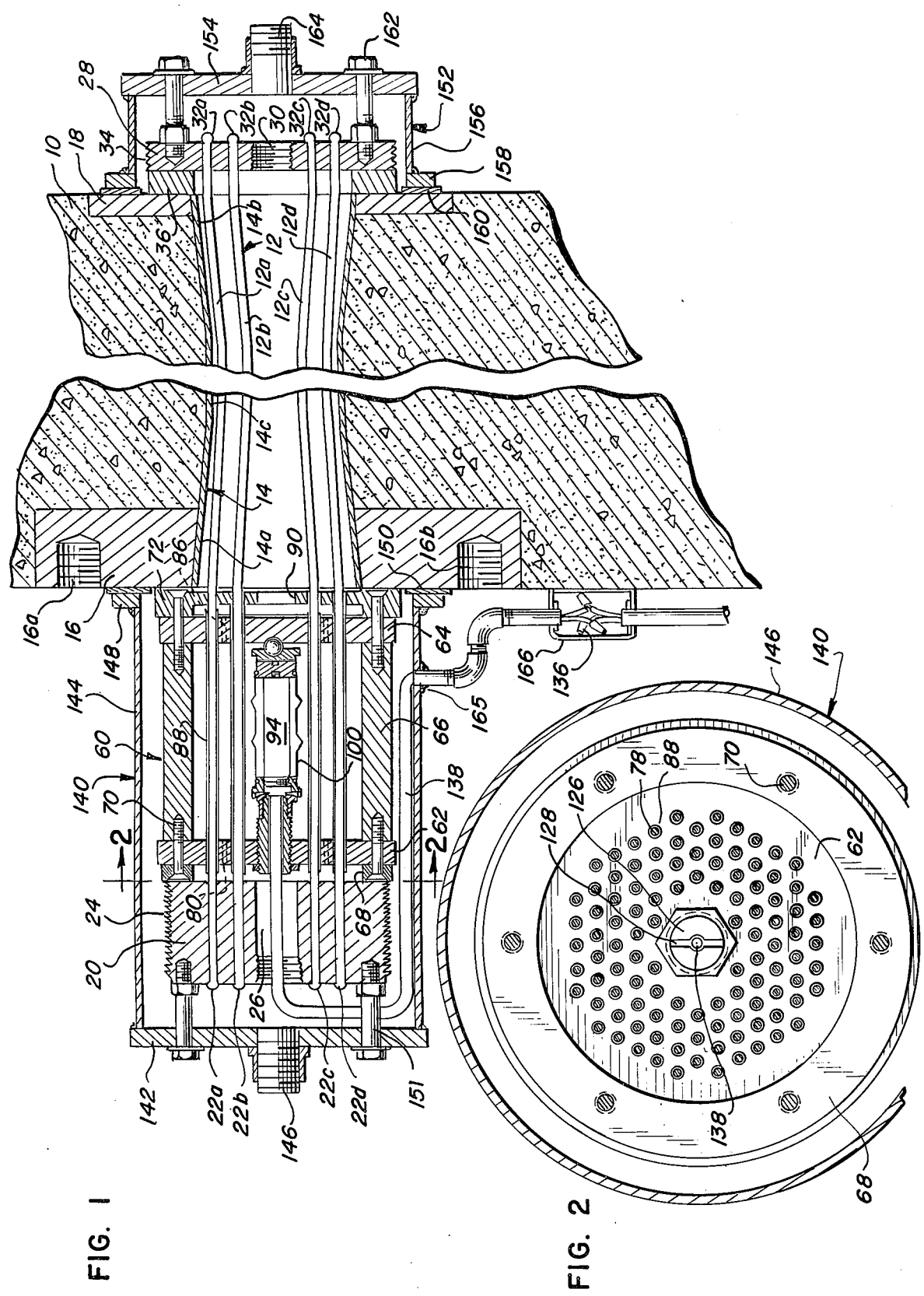

POST-TENSIONING LOAD CELL

BACKGROUND OF THE INVENTION

This invention relates to a load cell for measuring tensile load and changes in tensile load in a tendon. The invention has particular application to the monitoring of loads and changes in loads in tendons which extend through concrete structures and are tensioned to produce an initial compressive stress in the concrete structure. Such tendons may be constructed of a number of strands or "wires" which extend through a casing in the concrete structure and have their ends connected to stop members positioned on either side of the portion of the concrete structure being acted upon by the tendon. A tensile stress is applied to the tendon resulting in a corresponding compressive force on the concrete structure. The concrete structure is thereby post-tensioned in compression by the amount of tension that is present in the tendon which in turn will depend upon the average of the tensile loading of each of the wires comprising the tendon.

From the foregoing, it is apparent that the tendon acting through the stop members applied a compressive force to the concrete structure, and when a tensile loading is applied to the concrete this compressive force must be overcome before tensile stress develops in the concrete. Thus any changes in the tensioning of the tendon will alter the strength of the entire structure in tension. In many structures, such as secondary containment vessels for nuclear power plants, it is highly desirable to at least periodically monitor the tensioning in the tendon to make sure that no changes have occurred which would indicate a lessening of overall tensile strength of the reinforced structure.

Heretofore it has been common practice to periodically monitor the tensioning of the tendon by a post tensioning procedure involving the application of a tensile load to the stop member to determine the force required to overcome the tension in the tendon and to move the stop member away from the compressed structure. The force required to accomplish this would then be just slightly greater than the tension in the tendon being monitored. Such a procedure is cumbersome and time consuming, and it could be dangerous if there is a weakened wire in the tendon. Other procedures have been attempted. One such alternative procedure is to apply a number of bonded strain gages to the exterior wall of a spacing structure which has been positioned between one of the stop members and the concrete structure and has been placed in compression by the initial tension in the tendon. The readings of the strain gages would be averaged. Another alternative procedure involves the use of so-called "vibrating wires". The frequency of vibration of each wire varies with the tension in the wire. Such wires may be placed at various positions and again the readings averaged. However, all of these alternative procedures are complicated, cumbersome, and require an averaging of the readings taken.

The post-tensioning load cell constructed in accordance with this invention provides a less complicated, less expensive means of measuring the tensile load and variations in the tensile load on the tendon. The load cell is easy to install and easy to read and automatically averages the loads and changes of loads in the individual wires of the tendon. An important feature of the invention is that measurements are not affected by eccentricity in the components of the tendon or the components of the compressed structure or the components of the load cell.

SUMMARY OF THE INVENTION

The load cell constructed in accordance with this invention is for detecting changes in tensile loading of a multiwire structural post-tensioning tendon that extends between and is connected to stop members positioned on either side of the portion of the structure being placed under compression by the action of the tendon. The load cell comprises a pair of spaced end members. A tubular elastically deformable member extends between and is connected to the peripheral portions of the members. Means is provided for operatively connecting one end of said tubular member to one of the stop members with the axis of the tubular member being substantially coincidental with the axis of the tendon. Thus the forces applied to the stop member by the tendon will be transmitted to the tubular member. A telemetric means responsive to the dimension changes is provided, and means is carried by the spaced end members for mounting the telemetric means therebetween within the tubular member, with the central axis of the telemetric means being substantially aligned with the central axis of the tubular member. This central substantially coaxial positioning of the telemetric means is a feature of the invention and provides an automatic averaging of the tensile strain on the wires of the tendon.

In accordance with the preferred aspect of the invention, the spaced end members are plates which have identical discrete apertures therethrough corresponding to the number of wires or strands in the tendon, with the array of apertures being such that the wires of the tendon may pass through the spaced end members and the intermediate tubular member and will be disposed in a substantially balanced, uniform pattern circumjacent the telemetric means, whereby tension on the tendon will place the tubular member under corresponding compression.

In accordance with another aspect of the invention, the stop member connecting means at the one end of the tubular member is adapted to be disposed toward the structure being compressed by the tendon, and the tubular member is provided with a shoulder formation adjacent its other end. A tubular spacer means circumjacent the one end of the tubular member is positioned for engaging the shoulder formation on the tubular member and supporting the tubular member in spaced relationship with respect to the structure being compressed by the tendon, whereby tension on the tendon will place the tubular member under corresponding tension.

By locating the strain sensing meter centrally within the tubular steel element that carries the load of the post-tensioning tendon, the load cell eliminates the effects of eccentricity due to any and all causes, whether these be by unequal tension in the individual wires, irregularities in the wall thickness or the end conditions of the annular steel element, angular deviation of the base plate with respect to the direction of the tendon, or other causes.

BRIEF DESCRIPTION OF THE DRAWINGS

With reference to the drawings,

FIG. 1 is a cross-sectional view of a load cell constructed in accordance with one embodiment of the invention showing the load cell mounted in position on the post-tensioned tendon which extends through and places the concrete structure under compression.

FIG. 2 is a cross-sectional view taken substantially along line 2—2 of FIG. 1;

DETAILED DESCRIPTION OF THE PREFERRED EMBODIMENTS

Figure 3:
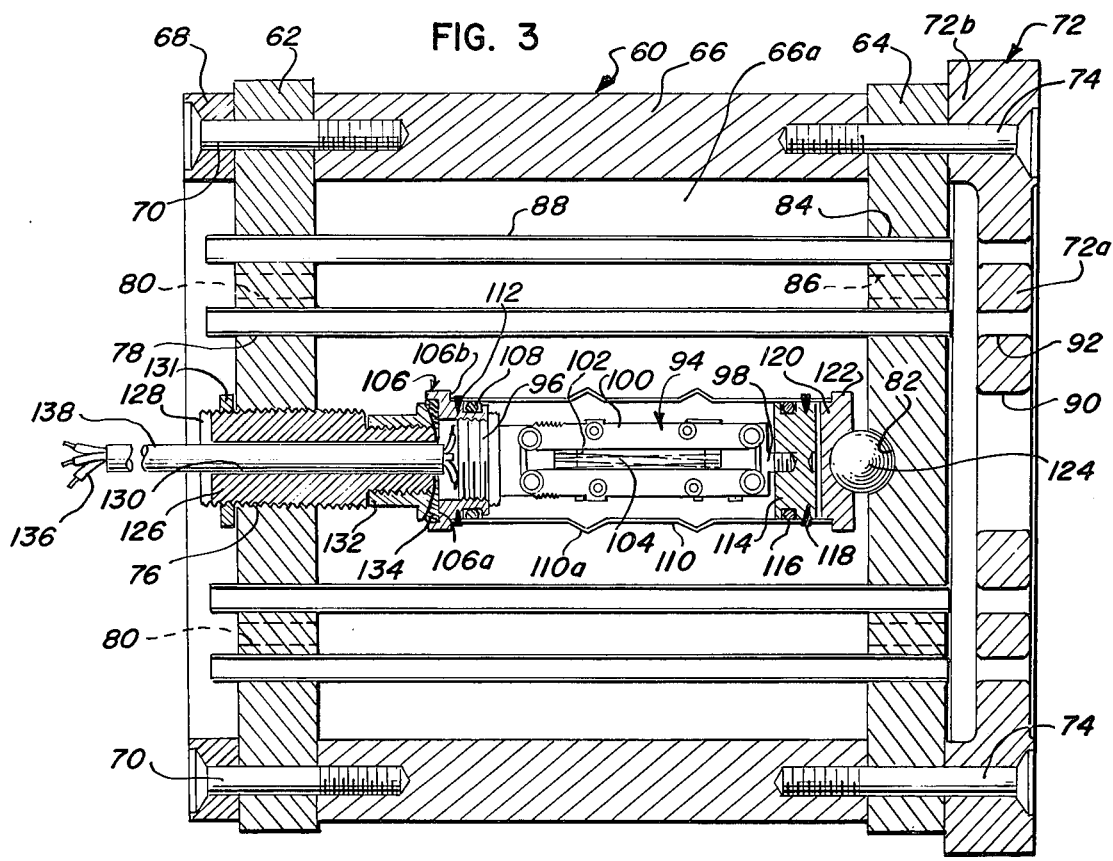
FIG. 3 is an enlarged cross-sectional view of the load cell removed from the tendon.

With further reference to the drawings and particularly to FIG. 1, there is shown a portion of a concrete structure 10 which is post-tensioned in compression by means of a steel multiwire structural post-tensioning tendon 12. In FIG. 1 the tendon 12 is illustrated schematically with only four strands, 12a, 12b, 12c and 12d being illustrated. In actual practice a tendon of this type would have on the order of perhaps 90 individual wires or strands, each wire being typically on the order of three-eighths of an inch in diameter, and either solid or stranded. The wires of the tendon 12 extend through a casing 14 in a concrete structure 10. The casing has a flared mouth or trumpet portion 14a adjacent one end and a similar flared mouth or trumpet portion 14b adjacent the other end. Between the trumpeted end portions 14a and 14b is an intermediate substantially cylindrical portion 14c. Cast into the concrete structure 10 surrounding the trumpeted end 14a of the casing 14 is a base plate 16 and a similar base plate 18 is cast into the concrete structure 10 surrounding the trumpeted end 14b of the casing. The base plate 16 has blind, threaded apertures 16a and 16b which may be utilized for mounting of a standard tensioning jack (not shown) for purposes which will be more fully hereinafter described.

One end of each of the wires of the tendon 12 extends through an individual aperture in a heavy first stop plate 20 and, a buttonhead or other stop means is provided on the end of each of the wires exterior of the plate 20. Thus, in FIG. 1 the wire 12a has a buttonhead 22a; the wire 12b has a buttonhead 22b; the wire 12c has a buttonhead 22c; and, the wire 12d has a buttonhead 22d. The buttonheads 22a–22d prevent the wires from being pulled out through the stop plate 20 even under the conditions of great tension to which the wires of the tendon 12 are subjected. The stop plate 20 has external threads 24 and a central aperture 26. The threads 24 permit the plate to be threaded onto the tensioning jack (not shown) in order to apply tension to the wires of the tendon 12. The opposite ends of the wires of the tendon extend through individual discrete apertures in a second stop plate 28, having a central aperture 30. At this end each of the wires is provided with a buttonhead or other stop means for preventing the end of the wire from being pulled out through the stop plate 28. Thus wire 12a has a buttonhead 32a; wire 12b has a buttonhead 32b; wire 12c has a buttonhead 32c; and, wire 12d has a buttonhead 32d.

The second stop plate 28 may be constructed identically to the first stop plate 20, although in the illustrated embodiment the plate 28 is somewhat thinner. This plate carries external threads 34, which also may be threaded into the tensioning jack (not shown) in order to apply the tension to the tendon 12 from this side of the tendon. In the particular embodiment illustrated in FIG. 1, it is preferred that the tensioning be applied from the right-hand side of the tendon, with the stop plate 28 being pulled to the right in order to apply tension to the tendon 12. Tensioning will elastically elongate the tendon, and when the proper tension has been applied to the tendon, a shim 36 is inserted between the stop plate 28 and the base plate 18. Thus, the tension remaining in the tendon 12 will be the tension required to elongate the tendon by a length equal to the thickness of the shim 36. There may, of course, be several shims between the base plate 18 and the plate 28. Each of the shims is annular and is preferably formed of two separate semicircular sections so that the respective sections may be inserted from opposite sides beneath the peripheral edges of the plate 28 surrounding the wires of the tendon 12. Only one of the semicircular portions of the shim 36 is illustrated in FIG. 1.

In many structures such as secondary containment vessels for nuclear power plants or dam structures, it is necessary to provide some means for testing the tension in the tendon 12 to make sure that it has been maintained at a sufficient level to properly exert the proper magnitude of compressive force upon the concrete structure. In order to accomplish this, the load cell 60 is positioned between the stop plate 20 and the base plate 16. This load cell is illustrated in detail in FIG. 3 and includes a pair of end plates 62 and 64 and an intermediate tubular support member 66 which is preferably cylindrical in shape having an inside diameter sufficient to accommodate the wires of the tendon 12 which pass through the device. On the exterior of the end plate 62 is an annular member or washer 68 which preferably has the same cross-sectional dimensions as the tubular support member 66 and is axially aligned therewith. A plurality of threaded fasteners 70 extend through the washer 68 and then through the end plate 62 into the support member 66 to securely fasten these members together in properly aligned relationship. The purpose of the annular member or washer 68 is to engage the stop plate 20 and to transmit the compressive forces directly through the peripheral portions of the plate 62 to the support member 66. The washer 68 serves to maintain the central portion of the stop plate 20 in spaced relationship from the central portion of the end plate 62, thereby assuring that any movement of the central portion of the end plate will be caused only by the uniform compressive forces applied through the washer 68.

On the exterior of the end plate 64 is a guide plate 72, and a plurality of threaded fasteners 74 extend through the guide plate 72 and then through the end plate 64 into the support member 66 to securely fasten these members together in proper alignment with each other and in alignment with the end plate 62 and washer 68 secured at the opposite end of the support member 66.

The support member 66 and the other load supporting portions of the load cell, including the end plates 62 and 64, the washer 68, and the guide plate 72, are all constructed of high-strength steel which will elastically deform but will not permanently deform under the tensile loads and compressive forces to which the tendon 12 and the load cell 60 respectively may be subjected. In other words, the product of the yield strength (in pounds per square inch) and cross-section (in square inches) of the support member 66 and each of the aforementioned other load supporting portions of the load cell is greater than the design loads (in pounds) of the tendon. In effect, the support member 66 elastically separates the end plates 62 and 64. These end plates will be moved toward one another as the tension on the tendon 12 (and the compression on the load cell 60) increases, and the end plates will be moved away from each other as the tension in the tendon 12 (and the compression on the load cell 60) decreases.

The end plate 62 has a central aperture 76 which is internally threaded for purposes which will be more fully hereinafter described. A plurality of smaller apertures 78 extend through the end plate 62 and are arranged in a balanced, uniform array about the central aperture 76. The number, the spacing and the positioning of these apertures 78 is identical to the number, the spacing and the positioning of the apertures through the stop plate 20. A plurality of additional apertures 80 are provided in the end plate 62 for the passage of oil or hot grease as will be more fully described. The end plate 64 has a central spherical cavity 82, and a plurality of apertures 84 surround this spherical cavity 82 and are positioned precisely in alignment with the apertures 78 in the end plate 62. Oil passageways 86 also extend through the end plate 64. The apertures 78 and 84 in the end plates 62 and 64 precisely align so that the wires of the tendon 12 may pass through these apertures and thence through the apertures in the stop plate 20 prior to the formation of the buttonheads on the end of the individual wires. This precise alignment of the apertures 78 and 84 in the respective end plates also assures parallel disposition of the portions of the wires of the tendon which pass through the load cell thereby minimizing bending and twisting of the wires in the space between the end plates of the load cell.

In order to facilitate the insertion of the load cell 60 onto the wires of the tendon 12 and to make sure that no difficulty will be encountered in passing the wires of the tendon through the aligned apertures 78 and 80 in the respective end plates 62 and 64, it is preferred that a guide tube or sleeve 88 extend between and through each pair of corresponding apertures 78 and 84 in the respective end plates. Thus the wires of the tendon will be guided through the load cell 60 by these tubes, and there will be no difficulty in making sure that all of the wires of the tendon stay in alignment with and pass through the proper apertures in the spaced end plates 62 and 64. The apertures 78 and 84 end plates are thus of sufficient diameter to accept the guide tubes 88, and the internal diameter of each of the guide tubes 88 is sufficient to readily permit the insertion and passage therethrough of one of the wires of the tendon 12.

The guide plate 72 has a central aperture 90, and around this central aperture in precise alignment with the apertures 84 in the end plate 64 are a plurality of apertures 92. The central portion 72a of the guide plate is spaced from the end plate 64, and the annular peripheral portion 72b of the plate is thicker and is in flat engagement with the peripheral portions of the end plate 64 and in substantial alignment with the support member 66 beneath the end plate 64. The thickened annular portion 72b may be entirely integral with the central portion 72a or the added thickness may be added by a separate annular washer. The purpose of the plate 72 is to transmit the compressive forces to the peripheral portions of the plate in line with the support member 66 and to permit a slight bend of the wires of the tendon 12 as they enter the flared end or trumpet portion 14a of the casing 14 through the concrete structure 10 without transmitting bending stresses or otherwise affecting the other portions of the load cell. It may be desirable to slightly angle the apertures 92 toward the central axis of the plate 72 in order to facilitate this bend. However, whether the apertures are slightly angled toward the center or not, the plate 72 will serve to absorb the bending stresses of the angled tendon wires on the load cell and prevent these stresses from being transmitted to the end plate 64.

Mounted centrally and preferably precisely on the central axis of the tubular support member 66 and aligned with the central axis of the array of apertures 78 and 84 in the end plate 62 and 64 and thus in alignment with the central axis of the tendon 12, is a strain measuring telemetric device 94. The particular telemetric device 94 illustrated in FIG. 3 is a Carlson strain meter of the type described and illustrated in U.S. Pat. No. 2,036,458 dated Apr. 7, 1936. Basically, this meter comprises two spaced anchoring members 96 and 98 connected by a framework 100 which carries a pair of coils of wire 102 and 104 under tension. As described in the aforementioned patent, the framework is arranged to increase the tension of one coil and decrease the tension of the other coil when the anchoring members move relative to each other. Various other types of strain measuring devices may be employed but the Carlson device has been found particularly useful in this application.

The telemetric device 94 is covered by means of a protective shell consisting of an axially apertured end piece 106 having an end recess 106a and a shoulder 106b at its outer end. The inner end of the end piece 106 is internally threaded so that the anchoring member 96 of the telemetric device 94 may be screwed thereinto. A peripheral recess at this inner end carries an O-ring 108, and a thin cylindrical brass protective sleeve 110 having pleats 110a for flexibility extends partially over the inner end of the end piece 106 and engages the shoulder 106b. This sleeve is sealingly engaged by the O-ring 108, and is staked to the end piece 106 by means of pins or wedges 112.

The other anchoring member 98 of the telemetering device 94 is screwed into an end piece 114 disposed within the opposite end of the brass protective sleeve 110. This end piece 114 also carries an O-ring 116 which sealingly engages the sleeve 110 and is staked to the sleeve by means of pins or wedges 118. Also disposed in the end of the protective sleeve 110 with the end piece 114 is a bearing member 120 having a shoulder portion 122 which bears against the end of the protective sleeve 110. The bearing member 120 has a cylindrical recess which mates with a spherical ball bearing 124 which also mates with and is partially accommodated within the spherical recess 82 at the center of the end plate 64. The bearing member 120, the ball bearing 124, and the recess 82 thus provide a self-centering mounting means for one end of the telemetering device 94.

The opposite end of the telemetering device 94 is mounted on the end plate 62 also by means of a self-centering mounting system. This mounting system comprises an adjustable screw member 126 which is externally threaded to fit the threads of the aperture 76 in the center of the end plate 62. A groove 128 in the exterior end of the screw 126 facilitates manipulation of this screw member, and the screw member has an axial aperture 130 which extends completely therethrough. A lock nut 131 on the exterior of the screw member 26 locks the screw member 26 in its desired position of adjustment with respect to the end plate 62. Threaded onto the inner end of the screw member 126 is a bearing nut 132 having a spherical end portion which mates with a spherical washer 134 disposed in the recess 106a of the telemetering device end piece 106. The mounting of the telemetering device 94 between the end plates 62 and 64 is thus a self-centering mounting for compressive loading of the load cell and of the telemetering device.

Since the load cell 60 is positioned between the stop member 20 and the base plate 16, the stop member 20 will bear against the washer 68 of the load cell and the guide plate 72 of the load cell will bear against the base plate 16. With the tendon 12 in tension, the load cell 60 will be under compression, and the compressive forces will be applied through the washer 68, the end plate 62, the intermediate tubular support member 66, the end plate 64 and the guide plate 72. As previously described, the compressive forces involved (caused by tension in the tendon) will cause the tubular high-strength steel support member 66 to elastically deform, so that the end plates 62 and 64 will move slightly toward each other as the compression is increased and slightly away from each other as the compression is decreased. Any such movement will be detected by the telemetering device 94 mounted between the end plates 62 and 64.

The wires 136 and the conduit 138 for these wires extend through the aperture 130 in the screw member 126 so that the ends of the wires may be connected to the telemetering device 94. After the load cell 60 has been completely assembled (as shown in FIG. 3) it is calibrated and then mounted on the tendon 12 (as shown in FIG. 1). Tensioning of the tendon is then done in the standard way with tensioning jacks (not shown) which may be mounted in place using the threaded holes 16a in the base plate 16 or base plate 18 (not shown).

The tendon 12 should be maintained free from corrosive environment in order to avoid eventual deterioration and necessitate replacement of the tendon. One means of sealing the tendon from the effects of the atmosphere is to surround the tendon with oil or grease. For this purpose, a container 140 is positioned over the stop member 20 and the load cell 60. This is best illustrated in FIG. 1. The container 140 may have a flat end portion or plate 142 and a substantially cylindrical body portion 144. The end plate 142 is provided with a tubular end fitting 146 through which grease or oil may be injected, and the substantially cylindrical body portion 144 extends over the stop member 20 and load cell 60 and carries an annular end ring 148 at the bottom of which is a seal ring 150 for resiliently and sealingly engaging the base plate 16. A plurality of threaded fasteners 151 extend through the plate 142 and into the stop member 20 thereby holding the container 140 in place covering the stop member and load cell.

Oil or hot grease may be injected through the tubular port or fitting 146. This oil or grease will first fill the space surrounding the stop member 20 and load cell 60 and will then pass downwardly through the aperture 26 in the stop member 20 and then through the oil passages 80 in the end plate 62 of the load cell. Although the load cell thus is filled with the oil or grease, the telemetering device 94 will be protected by the protective shell 110. The oil or hot grease will flow out through the passages 86 in the end plate 64 of the load cell, through the aperture 90 in the load cell guide plate 72 and into the trumpeted casing 14. The material will pass through the passageway filling all of the parts thereof until it flows out of the casing, through the shim 36 and through the center aperture 30 in the stop member 28. At this end of the device there is also a container 152 constructed substantially identical to the container 140. This container 152 has an end plate 154 and a cylindrical body portion 156 which carries an end ring 158 having a resilient seal member 160 attached. The container 152 surrounds the shim 36 and stop member 28 and the seal member sealingly engages the base plate 18. Threaded fasteners 162 extend through the plate 154 of the container and into the stop member 28 to lock the container 152 in position and to retain the oil or grease in place surrounding the wires of the tendon 12. The tubular port 164 in the plate 154 permits the injection of hot grease or oil from this end to fill the tendon assembly (which includes the load cell 60). The conduit 138 for the load cell wires 136 extends through a seal 165 in the cylindrical wall 144 of the container 140 and thence into a junction box 166.

An important feature of the invention is the positioning of the strain meter or telemetering device 94 at the center of the load cell in coaxial alignment with the strands or wires of the tendon 12. This eliminates the effects of eccentricity and results in an automatic averaging by the telemetering device 94 of the compressive loading on the load cell by the tension in the individual strands and avoids the necessity of averaging several readings. Moreover, the telemetering device is protected within the load cell, and since the load cell may be precalibrated, all that is necessary in order to install the load cell is to insert the wires of the tendon 12 therethrough at the same time that they are being inserted into the stop member 20. The load cell is completely reliable and accurate in providing information concerning changes in the tension in the tendon 12.

Figure 4:
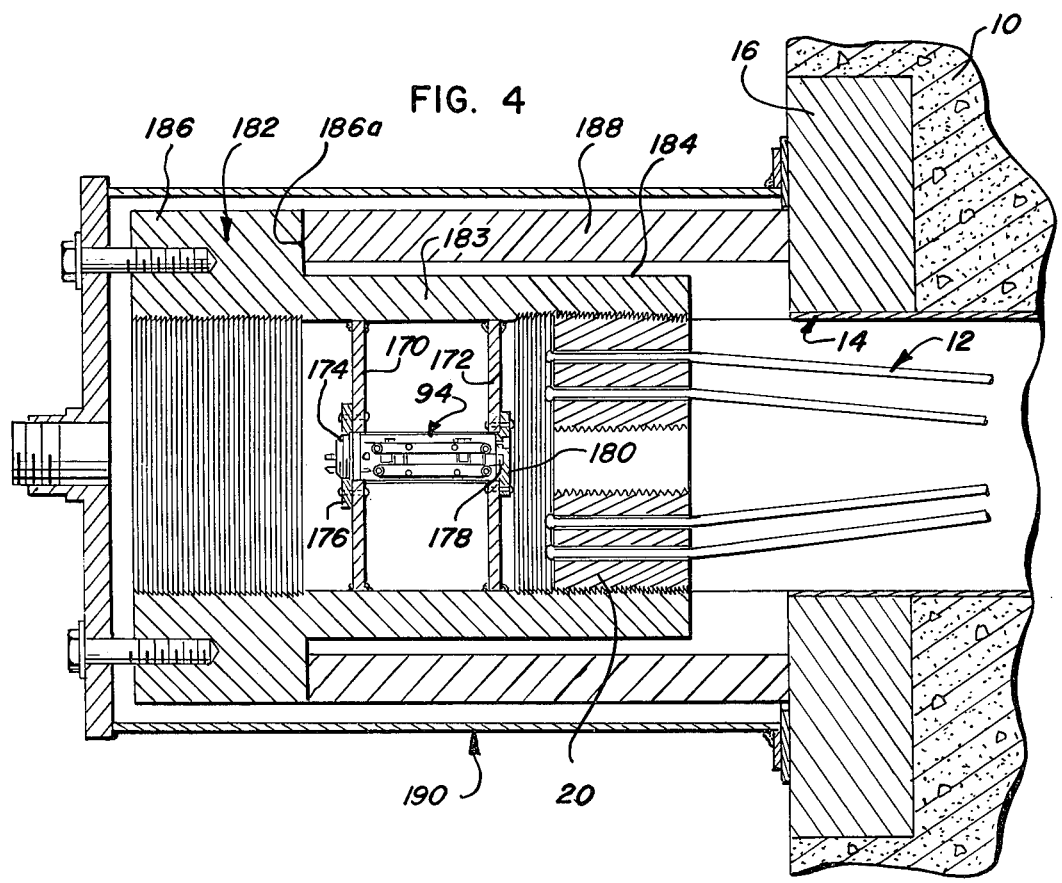
FIG. 4 is a cross-sectional view of a load cell of a modified construction.

In FIG. 4 there is illustrated an alternative embodiment of the invention wherein the telemetering device 94 is placed in tension between a pair of end plates 170 and 172. One of the anchoring members 174 of the telemetering device 94 is attached to a mounting plate 176 affixed to the end plate 170, and the other anchoring member 178 is threaded into or otherwise attached to the plate 180 affixed to the other end plate 172. The end plates 170 and 172 are staked, welded or otherwise affixed to the inner cylindrical surface of a cylindrical high-strength steel support member 182 so that the intermediate portion 183 between the end plates 170 and 172 serves to elastically maintain the end plates a fixed distance apart. The cylindrical member 182 has an internally threaded lower portion 184 of about the same outside diameter and an upper portion 186 of larger diameter and having a shoulder 186a. A cylindrical high-strength steel spacer 188 surrounds the lower cylindrical portion 184 of the member 182 and engages the upper portion shoulder 186a of the member thereby elastically supporting the member outwardly from the base plate 16 of the structure 10. The support member 182 is of sufficient cross-section and is heat treated to have sufficient yield strength to elastically support the end elements in spaced relationship under all loads which may be applied to the tendon. In other words, under all design loading of the tendon (and of the support member 182) there should be no permanent deformation of the support member 182. The spacer 188 is preferably of the same material and similarly treated.

The externally threaded stop member 20, as described in connection with the previous embodiment, is apertured to accommodate the passage therethrough of the wires of the tendon 12. This stop member is threaded into the internally threaded lower end portion 184 of the cylindrical support member 182, so that when tension is applied to the wires of the tendon 12, the lower end portion 184 and intermediate portion 183 of the member 182 will be placed in tension and the cylindrical spacer 188 will be placed in compression. Tension in the intermediate portion 183 will result in an elastic elongation of this portion of the steel cylindrical member 182 and cause the end plates 170 and 172 to move away from each other. In this manner, reduction in the tension in the wires of tendon 12 will permit the end plates 170 and 172 to move toward each other, and the changes in the relative position of the plates 170 and 172, i.e., the distance between the plates, will be detected by the telemetering device 94.

This particular embodiment may be employed where it is undesirable to have the strands or wires of the tendon 12 pass through the load cell or where alignment is a problem. A container 190 may surround the load cell to retain the protective oil or grease for the tendon, and this container may be constructed identically with the containers 140 and 152 of the previously described embodiment.

It is to be understood that the present disclosure has been made only by way of example and that many additional modifications and changes in various details may be resorted to without departing from the invention.

What is claimed is:

1. An apparatus for measuring changes in a structure being compressed, comprising in combination:
   1. a tendon assembly comprising a multiwire structural post-tensioning tendon having a stop member mounted at each end thereof arranged to have the structure to be compressed by the action of the tendon positioned intermediate said stop members,
   2. a load cell for detecting changes in tensile loading of said tendon, comprising an elastically deformable tubular support member having a pair of spaced-apart end elements mounted thereon, one of said stop members being operatively connected to one end of said support member, whereby force applied to said stop member by said tendon causes axial deformation of said support member, and
   3. telemetric means responsive to dimensional changes operatively mounted on means carried by said spaced-apart end elements within said tubular support member, whereby said telemetric means is adapted to detect relative movement of said end elements caused by axial deformation of said support member produced by changes in the tensile loading of said tendon, wherein both of said spaced end elements are apertured to accommodate the passage of the tendon through the cell, whereby the load cell may be positioned on the tendon between one of the stop members and the structure being compressed and tension on the tendon will place said support member under corresponding compression.

2. A load cell for detecting changes in tensile loading of a multiwire structural post-tensioning tendon which extends between and is connected to stop members positioned on either side of the portion of the structure being compressed by the action of the tendon, said load cell comprising a pair of spaced end elements adapted to be positioned between one of the stop members and the structure compressed by the action of the tendon, said end elements being apertured to accommodate the passage therethrough of the wires of the tendon, an elastically deformable tubular support member disposed between said end elements and capable of elastically separating said end elements under loads applied thereto up to and exceeding the design loading of the tendon, said support member having an opening therethrough of a size sufficient to accommodate the passage therethrough of the wires of the tendon, and telemetric means responsive to dimensional changes mounted between said end elements for detecting relative movement of said end elements such as would be produced by changes in the tensile loading of the tendon.

3. The load cell of claim 2 and further including mounting means carried by said end elements for mounting said telemetric means therebetween within the opening through said elastically deformable support member.

4. The load cell of claim 3 wherein said elastically deformable support member is cylindrical, and said mounting means is effective for mounting said telemetric device in substantially coaxial relationship with resect to said cylindrical support member.

5. The load cell of claim 2 wherein said telemetric means is mounted centrally within the opening through said elastically deformable element and the apertures in said end elements are so located that the wires of the tendon which pass through said end elements and said elastic element are disposed in a substantially balanced pattern about and in spaced relationship from said telemetric means.

6. The load cell of claim 2 wherein the apertures in the end elements for the passage of the tendon wires therethrough are aligned, whereby the wires of the tendon will be substantially parallel as they extend between said end elements and means is provided affixing said end elements to the respective opposite ends of said support member, whereby the alignment of said apertures may be maintained.

7. The load cell of claim 2 wherein guide means is provided between the corresponding apertures in said end elements, whereby the wires of the tendon will be guided through the load cell.

8. The load cell of claim 7 wherein a guide plate is mounted in fixed position in front of one of said end elements for engagement with the structure being reinforced by the tendon, said guide plate having a central portion which is disposed in spaced relationship with respect to said one end element and has apertures which correspond to and are positioned and aligned with the apertures in said one element, whereby said guide plate may guide the wires of the tendon into the load cell and will shield said one end element from bending stresses.

9. The load cell of claim 8 wherein said guide plate has an annular peripheral portion in engagement with said one end element and in substantial alignment with said support member.

10. The load cell of claim 2 wherein an annular member is mounted in fixed position in front of the other of said end elements for engagement with the one stop member.

11. The load cell of claim 10 wherein said annular member is affixed to said other end element in substantially aligned relationship with respect to said tubular support member circumjacent the tendon wire accommodating apertures in said other end element.

12. The load cell of claim 11 wherein said annular member has substantially the same transverse cross-sectional dimensions as said support member.

* * * * *